United States Patent [19]

Habermann

[11] 3,731,984

[45] May 8, 1973

[54] MAGNETIC BEARING BLOCK DEVICE FOR SUPPORTING A VERTICAL SHAFT ADAPTED FOR ROTATING AT HIGH SPEED

[76] Inventor: Helmet Habermann, 2 Allee Principale, Foret de Vernon par 27, France

[22] Filed: Oct. 21, 1971

[21] Appl. No.: 191,258

[30] Foreign Application Priority Data

Oct. 22, 1970 France............................7038,162

[52] U.S. Cl....................................................308/10
[51] Int. Cl.................................................F16c 39/06
[58] Field of Search...........................................308/10

[56] References Cited

UNITED STATES PATENTS

| 3,473,852 | 10/1969 | Lyman | 308/10 |
| 3,565,495 | 2/1971 | Lyman | 308/10 |
| 3,316,032 | 4/1967 | Wolf | 308/10 |
| 3,124,962 | 3/1964 | Hirtreiter | 308/10 |
| 3,490,816 | 1/1970 | Lyman | 308/10 |

Primary Examiner—R. Skudy
Attorney—Eric H. Waters et al.

[57] ABSTRACT

A shaft is suspended by upper and lower bearing blocks of the magnetic type. The upper and/or lower blocks are provided with a detector to sense when the shaft tends to leave a coaxial position in the associated block and a correction signal is generated and applied.

11 Claims, 4 Drawing Figures

PATENTED MAY 8 1973

MAGNETIC BEARING BLOCK DEVICE FOR SUPPORTING A VERTICAL SHAFT ADAPTED FOR ROTATING AT HIGH SPEED

FIELD OF INVENTION

This invention relates to magnetic bearing blocks and more particularly to blocks for retaining vertical shafts rotating at high speeds. The invention is particularly useful with respect to the axial and radial retention of centrifugal, and especially ultra-centrifugal, machines, since it is in this field of use that its application seems to present the greatest advantages.

BACKGROUND

Devices of the above-mentioned type may include two magnetic bearing blocks which insure both axial and radial retention of an associated vertical shaft, in general in the vicinity of the ends of the shaft.

Specific problems with which the invention is concerned include, for example, retaining with minimum frictional forces, a vertical shaft rotating at high speed with great rigidity in the axial sense (i.e. with small possibilities of displacement in the axial sense) and with lesser rigidity in the radial sense (i.e. with larger possibilities of displacement in the radial sense).

SUMMARY OF INVENTION

An object of the invention is to provide magnetic bearing blocks retaining with minimum frictional forces a vertical shaft rotating at speeds that can reach, for example, 100,000 RPM and in which critical frequency ranges are easily traversed due to low radial stiffness of the magnetic bearing blocks with respect to axial stiffness.

Another object of the invention is to provide a magnetic bearing block device that is reliable, rugged and insensitive to aggressive atmospheres.

Still another object of the invention is to provide a magnetic bearing-block device permitting variations in the length of the rotating shaft without any change in the stiffness characteristics of the two magnetic bearing blocks.

To achieve the above and other of its objects, the invention provides a device which includes two coaxial magnetic bearing blocks cooperating with a vertical rotating shaft, in general in the vicinity of the two ends of the shaft. The device is characterized in that the upper of the magnetic bearing blocks exerts an upward axial force on the rotating shaft, this magnetic bearing block including at least one coil of which the power supply is controlled by a detector of the axial position of the rotating shaft, so that the air gap of this magnetic bearing block remains constant. The lower of the magnetic bearing blocks also exerts an axial force on the rotating shaft.

Both of these magnetic bearing blocks are, in addition, arranged to exert radial forces on the rotating shaft, tending to bring the shaft back to a coaxial position in the two magnetic bearing blocks, just as soon as the shaft tends to leave that position. As a result, the rotating shaft is retained very rigidly in the axial sense and much less rigidly in the radial sense.

The invention also consists of certain other arrangements, used preferably at the same time, which will be covered more explicitly hereafter.

In any case, the invention will be best understood from description which follows and the appended drawings. The following description and drawings relate to a preferred embodiment of the invention and are not, of course, of limitative character.

DETAILED DESCRIPTION

Figure 1:
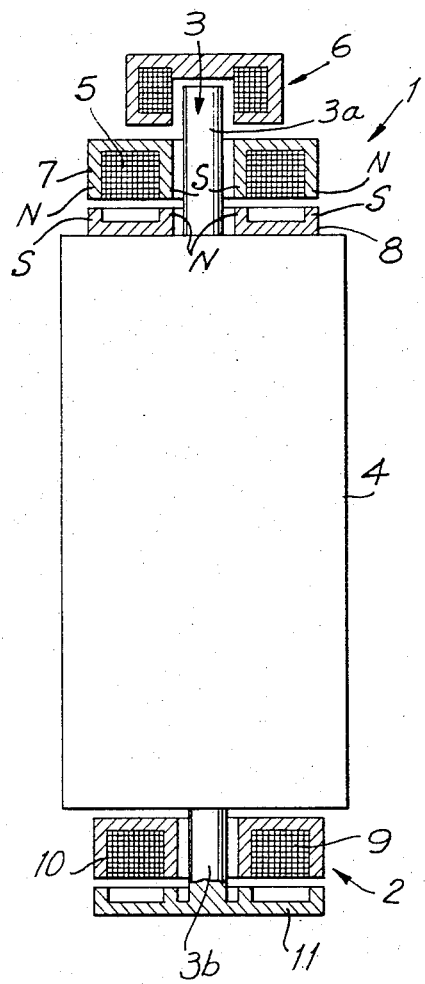
FIG. 1 is a schematic axial cross-section of a magnetic bearing-block device provided in accordance with a first embodiment of the invention.
Figure 2:
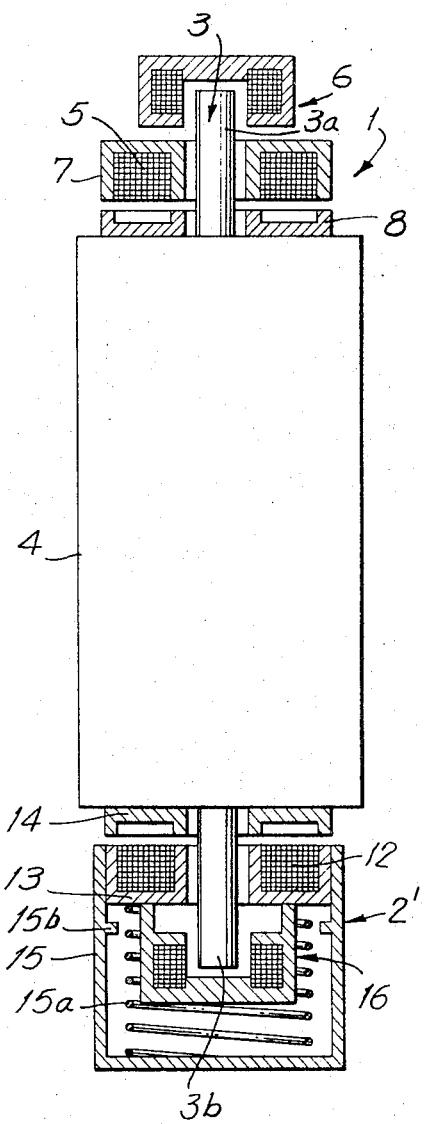
FIG. 2 is an axial cross-section of a magnetic bearing-block device in accordance with a second embodiment of the invention.

As shown in FIGS. 1 and 2, each magnetic bearing block device includes two coaxial magnetic bearing blocks 1 and 2 or 2' cooperating respectively with the two ends 3a and 3b of a vertical rotating shaft 3.

This rotating vertical shaft 3 supports the casing 4 of a centrifugal or ultra-centrifugal machine rotating at high speed under the action of motors (not shown), such as an electric motor incorporated in said casing 4.

The upper magnetic bearing block 1 exerts an upward axial force on shaft 3. This magnetic bearing block 1 includes at least one coil 5 the power supply of which is controlled by a position detector 6 which is adapted to detect the axial position of shaft 3, so that the air gap of this upper magnetic bearing block remains constant.

The lower magnetic bearing block 2 also exerts an axial force on shaft 3. Both of the magnetic bearing blocks 1 and 2 further exert radial forces on the rotating shaft 3, tending to bring it back to its coaxial position in the two magnetic bearing blocks 1 and 2, as soon as the shaft tends to leave this axial position.

The upper magnetic bearing block 1 includes a single annular coil 5, arranged coaxially to the bearing-block axis and placed within a fixed metal frame 7, the meridian section of which has the form of an inverted U. This metal frame 7 is placed above an annular polar part 8 integral with the shaft 3 and the meridian section of which has the form of a normal or upright U (open at the top).

Concerning the means according to which the lower magnetic bearing block 2 exerts an upward axial force on the shaft 3 in FIG. 1, the said magnetic bearing block 2 includes an annular coil 9, coaxial with the axis of bearing block 2 and enclosed in a fixed metal frame 10, the meridian section of which has the form of an inverted U. This metal frame 10 is placed above an annular polar part 11 integral with the shaft 3, the meridian section of which has the form of a normal U.

Concerning the means according to which the lower magnetic bearing block 2' exerts a downward axial force on the shaft 3 in FIG. 2, this magnetic bearing block 2' includes an annular coil 12, coaxial with the axis of bearing block 2' and enclosed in a fixed metal frame 13, the meridian section of which has the form of a normal U.

This metal frame 13 is placed below an annular polar part 14 integral with the shaft 3 and the meridian section of which has the form of an inverted U.

Within such magnetic bearings blocks (i.e. upper block 1 or lower block 2 or 2'), the axis of the bearing block coil (coil 5, 9 or 12) coincides with the axis of the corresponding metal frame (frame 7, 10 or 13). Since this metal frame has the form of a U, the magnetic flux is forced to rotate about the housing of the coil in question, creating magnetic poles N and S shown in FIG. 1 in connection with the upper bearing block 1. Therefore, the peripheral portion of the corresponding annular polar part (polar part 8, 11 or 14) always has the same polarity during its rotation and, if the axes of the bearing block and the corresponding coil coincide, the induction at any point of the annular polar part is invariable during its rotation. It can be seen then that the magnetic frictional torque is reduced to a minimum value.

When the assembly formed by the rotating shaft 3 and the casing 4 is likely to undergo variations in length during operation, it is advantageous to mount the metal frame 13, protecting the annular coil 12 of the lower bearing block 2, so that it slides within a fixed support 15, this metal frame 13 being returned downwardly by a return spring 15a. A thrust bearing 15b is provided to limit the downward displacement of the metal frame 13.

A position detector 16 is provided to cooperate with the corresponding end of shaft 3, this position detector controlling the power supply of the annular coil 12, so that the air gap of this lower magnetic bearing block 2 remains constant. With respect to position detector 16 as well as position detector 6, it is advantageous to use magnetic detectors.

Figure 3:
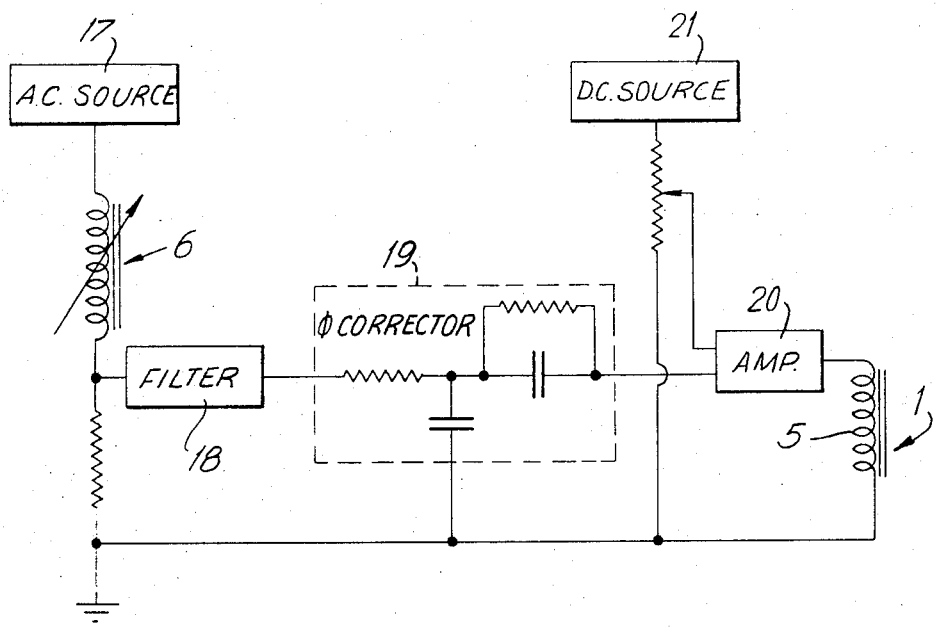
FIG. 3 is an electric wiring diagram related to one of the magnetic bearing blocks of the device of the invention.

FIG. 3 shows a schematic diagram of an electronic circuit for the slaving between the position detector 6 and the annular coil 5 of the upper magnetic bearing block 1. Therein, the coil of the magnetic position detector 6 is fed by an A.C. source 17, and the signal delivered by this position detector is introduced into a line including successively: a filter 18, a phase advance corrector 19 and an amplifier 20, which also receives D.C. delivered by D.C. source 21, proportional to the apparent weight of the assembly consisting of rotary shaft 3 and centrifugation cell 4. This amplifier 20 feeds the annular coil 5 of the upper magnetic bearing block 1 directly.

Figure 4:
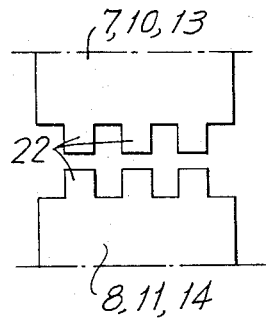
FIG. 4 illustrates a detail related to the magnetic bearing blocks of the device of the invention.

For better centering of the upper magnetic bearing block 1 and the lower one 2, it is advantageous, as shown in FIG. 4 to shape the opposite parts of the metal frames 7, 10 and 13 and the annular parts 8, 11 and 14 such that said parts have teeth 22 facing each other.

Preferably, the magnetic bearing blocks 1 and 2 are arranged so that they operate far from the magnetic saturation point, thus permitting relatively large displacements in the radial sense without affecting the axial forces exerted by said bearing blocks 1 and 2.

As an example for a suspended weight of about 10 kgs., one may design a magnetic bearing-block device providing stiffness in the axial sense corresponding to a play of approximately 0.1 mm. and insuring stiffness in the radial sense corresponding to a play of approximately 1 mm.

A magnetic bearing block device in conformity with the invention provides a certain number of advantages, among which the following may be noted:

the device permits obtaining a high-rigidity suspension in the axial sense and low-rigidity suspension in the radial sense.

the device operates through critical frequency ranges without disadvantage.

the device is reliable, rugged and insensitive to aggressive atmospheres.

the device permits variations in the length of the rotating shaft without changing the stiffness characteristics of the two magnetic bearing blocks.

the device engenders only very low frictional torques and does not require any contact between movable parts.

The invention is in no way limited to the preceding text. On the contrary, it covers all possible variants.

What is claimed is:

1. A magnetic-bearing block device for supporting a vertical shaft adapted for rotating at high speed, said device comprising upper and lower coaxial magnetic-bearing blocks cooperating with said shaft such that the upper magnetic-bearing block exerts an upward axial force on said shaft, said blocks defining respective air gaps with said shaft, said upper magnetic-bearing block including at least one coil supported by a fixed support, a power supply for said coil, and an axial position detector for detecting the axial position of the rotating shaft, said power supply being controlled by said axial position detector so that the air gap between the shaft and the upper magnetic-bearing block is kept constant, the lower magnetic-bearing block including at least one coil supported by a movable support and exerting an axial force on the rotating shaft, return means acting on said movable support, said movable support being slidable against the action of said return means, a power supply for said coil and a position detector to cooperate with the shaft, said power supply being controlled by said position detector so that the air gap between the shaft and the lower magnetic-bearing block is kept constant.

2. A device as claimed in claim 1, wherein the upper magnetic bearing block has an axis and said coil is an annular coil arranged coaxially to the bearing block axis, comprising a fixed metal frame of inverted U-shape enclosing said coil and an annular polar part integral with the shaft and the meridian section of which is in the form of an upright U, said frame being located above said part.

3. A device as claimed in claim 1, wherein the lower magnetic bearing block is arranged to exert an upward axial force on the shaft.

4. A device as claimed in claim 1, wherein the lower magnetic bearing block is arranged to exert a downward axial force on the shaft.

5. A device as claimed in claim 3, wherein the lower magnetic bearing block includes an annular coil a metal frame the meridian section of which has the form of an inverted U enclosing the latter said coil and an annular polar part integral with the shaft and the meridian section of which has the form of an upright U, said frame being located above said part.

6. A device as claimed in claim 4, wherein the lower magnetic bearing block includes a fixed metal frame, the meridian section of which has the form of an upright U, and an annular polar part integral with the shaft and the meridian section of which has the form of an inverted U, the frame being located below said part.

7. A device as claimed in claim 1, wherein each position detector is a magnetic detector.

8. A device as claimed in claim 7, wherein the shaft is in an assembly with a driven part and the magnetic position detector includes a coil, an A.C. source feeding said coil, and means to receive a signal delivered by said position detector, said means including in series a filter, a phase advance corrector and an amplifier, a D.C. source feeding said amplifier a D.C. signal proportional to the weight of said assembly, said amplifier feeding the coil of the upper magnetic bearing block directly.

9. A device as claimed in claim 5, wherein the part and the metal frame include teeth facing each other.

10. A device as claimed in claim 6, wherein the part and the metal frame include teeth facing each other.

11. A device as claimed in claim 1, wherein the magnetic bearing block is of such material and the coil is so arranged that the operational point thereof is in the non-saturation range.

* * * * *